United States Patent
Brandt et al.

(10) Patent No.: US 12,007,933 B2
(45) Date of Patent: *Jun. 11, 2024

(54) BI-DIRECTIONAL BUS TOPOLOGY

(71) Applicant: Rockwell Automation Technologies, Inc., Mayfield Heights, OH (US)

(72) Inventors: David D. Brandt, Milwaukee, WI (US); Scott T. Griffiths, Milwaukee, WI (US); Dayin Xu, Shanghai (CN); Yutao Wang, Milwaukee, WI (US); Wojciech Koczwara, Katowice (PL)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/853,614

(22) Filed: Jun. 29, 2022

(65) Prior Publication Data

US 2022/0335001 A1  Oct. 20, 2022

Related U.S. Application Data

(63) Continuation-in-part of application No. 17/019,897, filed on Sep. 14, 2020, now Pat. No. 11,403,248.

(51) Int. Cl.
*G06F 13/42* (2006.01)
*G06F 13/40* (2006.01)

(52) U.S. Cl.
CPC ...... *G06F 13/4282* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 6,188,181 B1 * | 2/2001 | Sinha | H05B 47/18 315/293 |
| 6,834,318 B2 | 12/2004 | Hunter et al. | |
| 7,012,815 B2 | 3/2006 | Garnett et al. | |
| 7,660,938 B1 | 2/2010 | Chow et al. | |
| 8,638,838 B1 | 1/2014 | Betts et al. | |
| 8,936,194 B1 | 1/2015 | Welch et al. | |
| 8,971,423 B1 | 3/2015 | Fu et al. | |
| 10,355,853 B1 * | 7/2019 | Surmi | G06F 21/575 |
| 10,502,572 B1 * | 12/2019 | Surmi | G01B 11/26 |
| 2003/0099253 A1 * | 5/2003 | Kim | H04L 7/0008 370/461 |
| 2003/0140274 A1 | 7/2003 | Neumiller et al. | |
| 2006/0030968 A1 | 2/2006 | Ko et al. | |

(Continued)

FOREIGN PATENT DOCUMENTS

| | | |
|---|---|---|
| EP | 1050824 A2 | 11/2000 |
| EP | 1728169 A0 | 9/2005 |

*Primary Examiner* — Henry Tsai
*Assistant Examiner* — Christopher A Bartels
(74) *Attorney, Agent, or Firm* — Foley & Lardner LLP

(57) ABSTRACT

For a bi-directional bus topology, a node connection includes two select line connections for a select line of a serial network. The select line is broken at the node connection. A bus direction module configures a first select line connection for an input line and a second select line connection for an output line in response to detecting a selection event. At least a portion of the bus direction module includes one or more of hardware and executable code, the executable code stored on a memory.

20 Claims, 22 Drawing Sheets

(56) References Cited

U.S. PATENT DOCUMENTS

| | | |
|---|---|---|
| 2006/0250114 A1 | 11/2006 | Faberman et al. |
| 2007/0085424 A1 | 4/2007 | Scharnick |
| 2010/0070696 A1 | 3/2010 | Blankenship |
| 2010/0260247 A1 | 10/2010 | Albiston et al. |
| 2012/0299480 A1 | 11/2012 | Peting et al. |
| 2014/0047158 A1 | 2/2014 | Frans et al. |
| 2014/0237177 A1 | 8/2014 | Yu et al. |
| 2015/0058642 A1 | 2/2015 | Okamoto et al. |
| 2015/0106560 A1* | 4/2015 | Perego ............... G06F 12/0638 711/105 |
| 2015/0124839 A1* | 5/2015 | Kim ..................... H04L 69/18 370/467 |
| 2016/0182154 A1 | 6/2016 | Fang et al. |
| 2016/0261127 A1 | 9/2016 | Worry et al. |
| 2016/0378704 A1 | 12/2016 | Adamson et al. |
| 2018/0191523 A1 | 7/2018 | Shah et al. |
| 2018/0284860 A1 | 10/2018 | Haussermann |
| 2019/0052539 A1* | 2/2019 | Pappu ................... H04L 43/50 |
| 2019/0141133 A1* | 5/2019 | Rajan ................. G06F 13/4282 |
| 2019/0385057 A1 | 12/2019 | Litichever et al. |
| 2021/0083505 A1 | 3/2021 | Beaston |
| 2021/0188252 A1* | 6/2021 | Lu ....................... B60W 40/12 |

\* cited by examiner

Two Pairs

BI-DIRECTIONAL BUS TOPOLOGY

BACKGROUND INFORMATION

This application is a continuation-in-part application of and claims priority to U.S. patent application Ser. No. 17/019,897 filed on Sep. 14, 2020 for David D. Brandt, which is incorporated herein by reference.

BACKGROUND INFORMATION

The subject matter disclosed herein relates to bus topology.

BRIEF DESCRIPTION

An apparatus for bi-directional bus topology is disclosed. The apparatus includes a node connection and a bidirectional module. The node connection includes two select line connections for a select line of a serial network. The select line is broken at the node connection. The bus direction module configures a first select line connection for an input line and a second select line connection for an output line in response to detecting a selection event. At least a portion of the bus direction module includes one or more of hardware and executable code, the executable code stored on a memory.

A method for a bidirectional bus topology is also disclosed. The method detects a selection event at a node connection comprising two select line connections for a select line of a serial network. The select line is broken at the node connection. The method further configures a first select line connection for an input line and a second select line connection for an output line in response to detecting the selection event.

A system for bidirectional bus topology is also disclosed. The system includes an originator device and a node device. The originator device originates a selection signal. The node device includes two select line connections for a select line of a serial network. The select line is broken at the node connection. The node device configures a first select line connection for an input line and a second select line connection for an output line in response to detecting a selection event of the selection signal. At least a portion of the originator device and the node device comprises one or more of hardware and executable code, the executable code stored on a memory.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
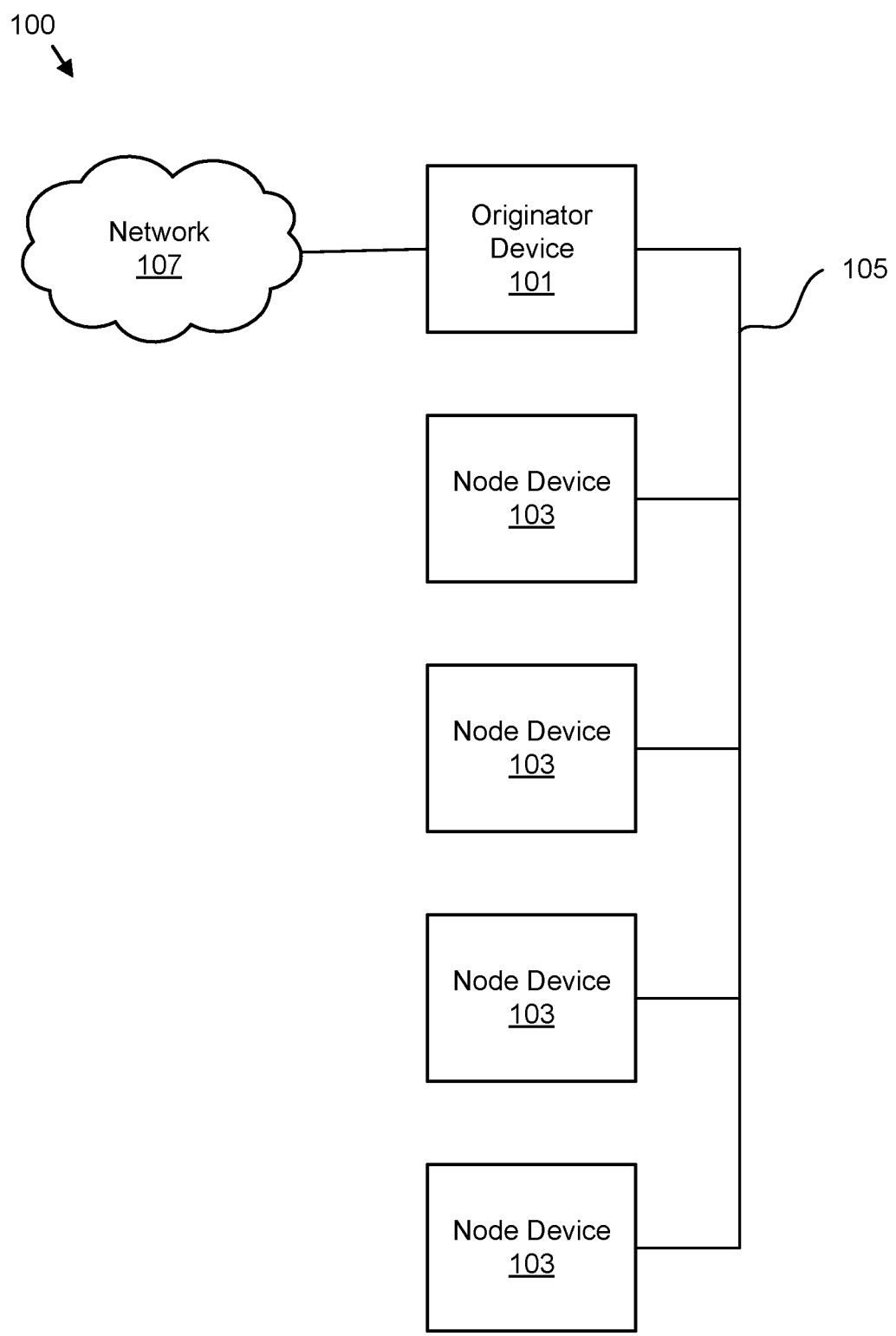
FIG. 1A is a schematic block diagram of communication system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electro-magnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of communication system 100. The communication system 100 supports communications among a plurality of node devices 103 and an originator device 101. In one embodiment, the communication system 100 supports communications between the node devices 103 and/or originator device 101 and a network 107.

The node devices 103 and/or originator device 101 may be controls, displays, sensors, indicators, and the like. In one embodiment, the node devices 103 and/or originator device 101 are disposed within industrial automation equipment such as a motor controller. The node devices 103 and the originator device 101 are connected via a serial network 105. In the depicted embodiment, the serial network 105 comprises a single cable. The serial network 105 provides an efficient physical connection between the node devices 103 and/or the originator device 101. For example, the serial network 105 may connect a plurality of control node devices 103 to the network 107. The use of the serial network 105 reduces point-to-point hardwiring of the node devices 103, and so reduces the cost of communications between the node devices 103 and/or originator device 101 in the network 107.

Figure 1B:
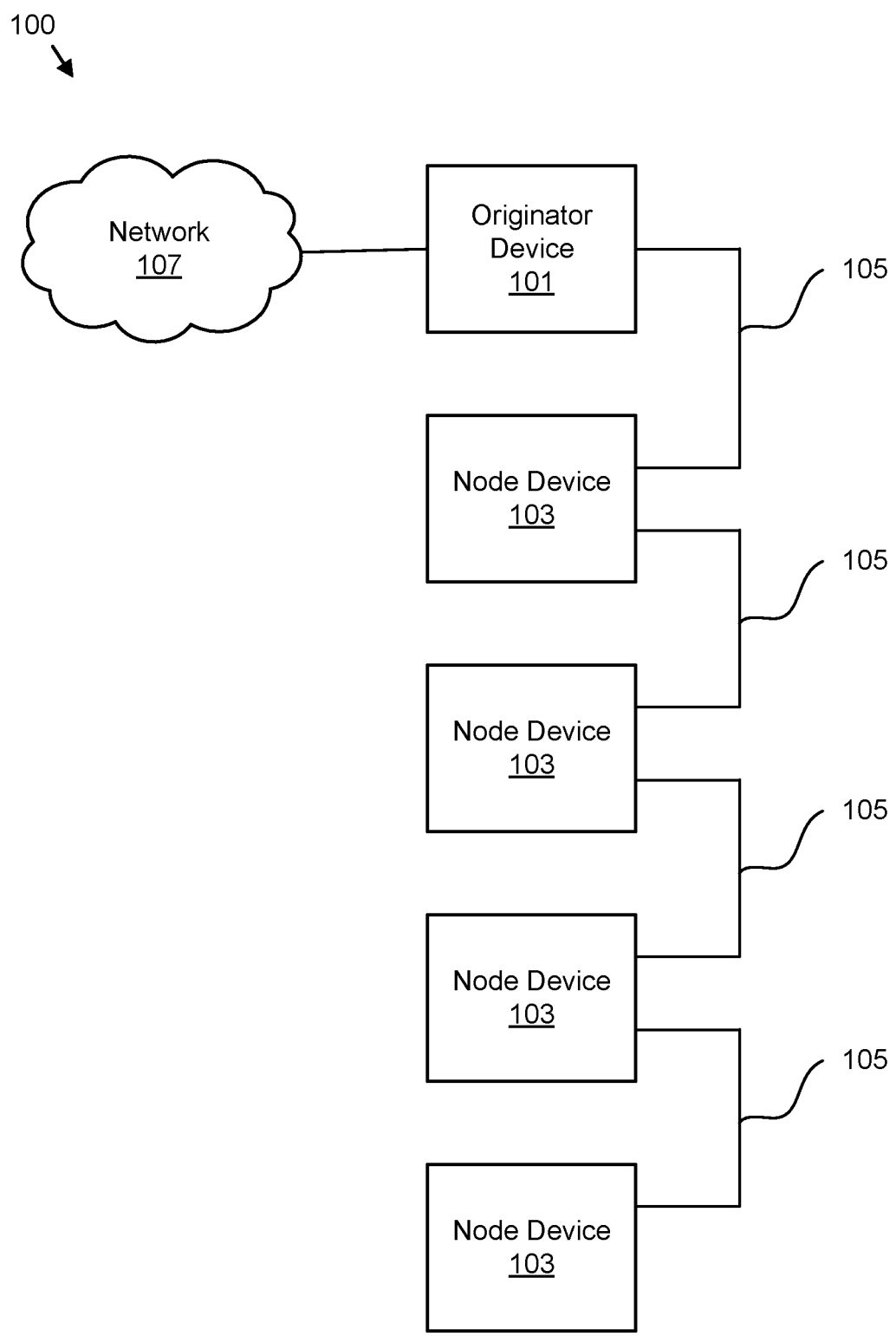
FIG. 1B is a schematic block diagram of communication system according to an alternate embodiment.

FIG. 1B is a schematic block diagram of the communication system 100 of FIG. 1A. In the depicted embodiment, the serial network 105 comprises a plurality of point-to-point connections between node devices 103 and/or the originator device 101.

Figure 1C:
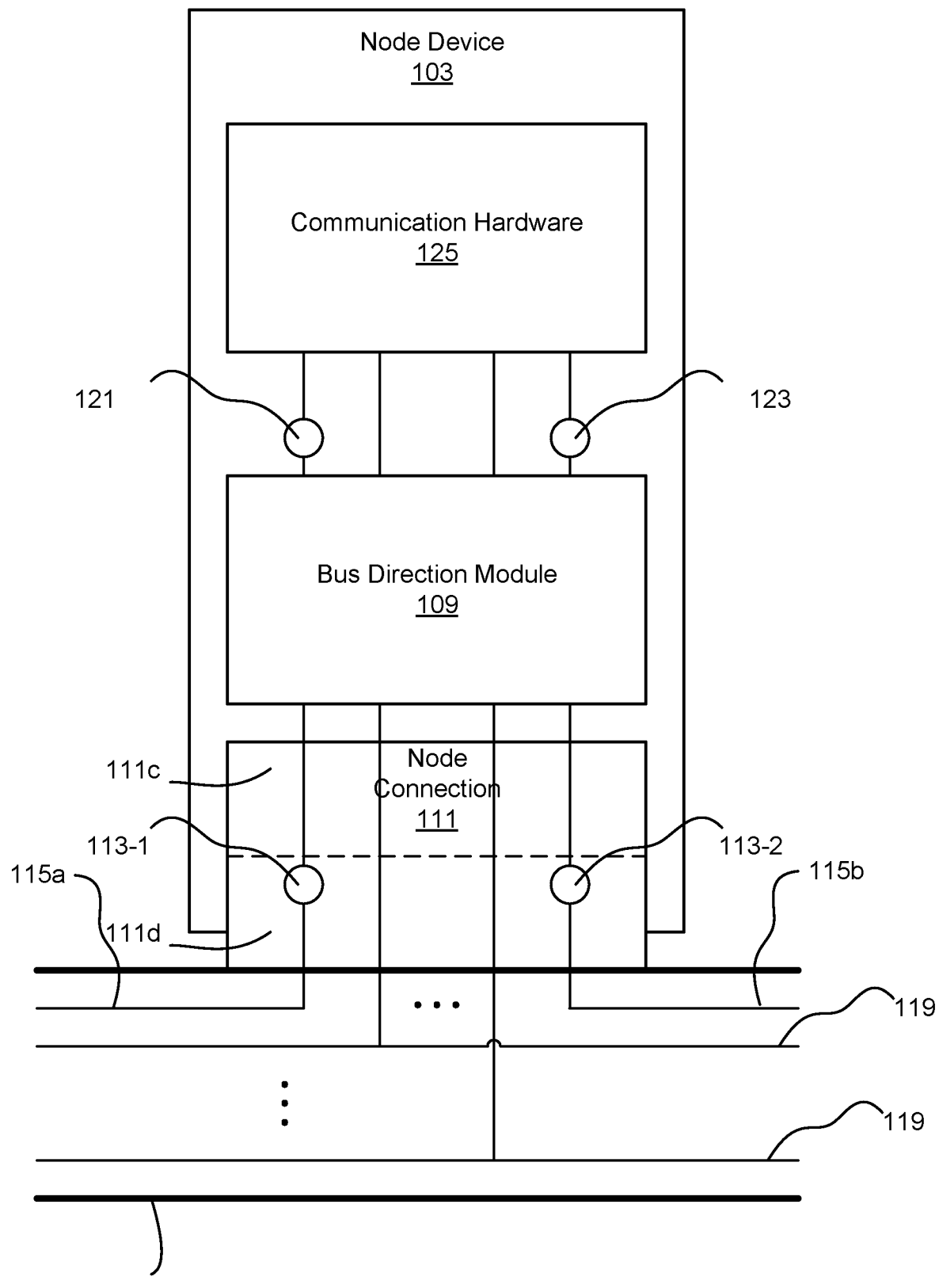
FIG. 1C is a schematic diagram of a node device and serial network according to an embodiment.

FIG. 1C is a schematic diagram of a node device 103 and serial network 105. In the depicted embodiment, the serial network 105 connects to the node device 103 via a node connection 111. The node connection 111 comprises a node connection 111*d* in physical communication with the serial network 105 and a node connection 111*c* in physical communication with node device 103. The node connection 111 may be a connector. In addition, the node connection 111 may be cable connection point assembly.

The serial network 105 includes a plurality of lines 119. The lines 119 may include serial communication lines, power lines, bus lines, and the like. A select line 115 may locate node devices 103 on the serial network 105. In one embodiment, the select line 115 commissions node devices 103 for communication.

The node connection 111 comprises two select line connections 113-1/2 for the select line 115 of the serial network 105. One select line connection 113-1/2 connects to an input line 121 and the other select line connection 113-1/2 connects to an output line 123 for communication hardware 125. The communication hardware 125 may propagate the selection signal according to the protocol for the serial network 105.

As shown, the select line 115 is broken at the node connection 111. An asserted selection signal may be received on an upstream select line 115*a* connected to the input line 121 by a first node device 103. The first node device 103 accesses the lines 119 and determines if the first node device 103 is to send and/or receive communications via the lines 119. If the first node device 103 is to send and/or receive communications via the lines 119, the first node device 103 de-asserts the output a downstream select line 115*b* for a subsequent node device 103 and communicates via the lines 119. If the first node device 103 is not to send and/or receive communications via the lines 119, the first node device 103 asserts the output line 123 connected to the downstream select line 115*b* for the subsequent node device 103. A subsequent node device 103 accesses the lines 119 to determine whether the subsequent node device 103 is to send and/or receive communications via the lines 119. Thus, the select line 115 determines which node device 103 communicates via the lines 119.

Because the select line 115 at each node device 103 has the upstream select line 115*a* and the downstream select line 115*b*, in the past, the serial network 105 and cable thereof could only be oriented at each node device 103 in a single direction so that one select line connection 113 always connected to the input line 121 and the other select line connection 113 always connected to the output line 121. For example, an upstream serial network 105 from the direction of the originator device 101 would always be oriented to the left of the node device 103. Alternatively, the upstream serial network 105 from the direction of the originator device 101 would always be oriented to the right of the node device 103.

As a result, adding an additional row of node devices 103 required that the serial network 105 be doubled back before starting the additional row. For example, if the serial network 105 is oriented from upstream on the left to downstream on the right, after the serial network 105 connects the first row of node devices 103 from left to right, the serial network 105 must double back to start the additional row of network devices 103 from left to right. As a result, the length of the serial network 105 is increased and the space required by the serial network 105 is enlarged.

The embodiments described herein configure a first select line connection 113 of the select line connections 113-1/2 for the input line 121 and the second select line connection 113 of the select line connections 113-1/2 for the output line 123 in response to a selection event. As a result, a single serial network 105 may connect two rows of node devices 103 in multiple directions. For example, the serial network 105 may connect to rows of node devices 103 in both a left to right direction and also a right to left direction. In addition, the serial network 105 may connect to rows of node devices 103 in both a top-to-bottom direction and also a bottom-to-top direction. Thus, the embodiments reduce the length and space requirement of the serial network 105 when connecting multiple rows of node devices 103.

The node device 103 may include a bus direction module 109 that configures a first select line connection 113 for the input line 121 and a second select line connection 113 for the output line 123 in response to the selection event. At least a portion of the bus direction module 109 comprises one or more of hardware and executable code, the executable code stored on a memory as will be described hereafter.

The serial network 105 may employ a Local Interconnect Network (LIN) protocol. The serial network 105 may employ the LIN protocol that is specified by the filing date of the present application. The select line connections 113-1/2 may be configured as related protocol signals extending the function of a LIN serial bus communication within lines 119. For example, a first select line connection 113-1 may be configured as a microcontroller (MCU) general purpose input output (GPIO) input pin for a LIN input select line and a second select line connection 113-2 may be configured as an MCU GPIO output pin for a LIN output select line. Similarly, a first select line connection 113-1 may be configured as an MCU GPIO output pin for a LIN output select line and a second select line connection 113-2 may be configured as an MCU GPIO input pin for a LIN input select line.

In addition, the serial network 105 may employ a SmartWire protocol. The serial network 105 may employ a SMARTWIRE-DT® protocol. For example, a first select line connection 113-1 may be configured as an address IN pin for a SmartWire input select line and a second select line connection 113-2 may be configured as an address OUT pin for a SmartWire output select line. Similarly, the serial network 105 may employ a LIN protocol, where a first select line connection 113-1 may be configured as an address OUT pin for a SmartWire output select line and a second select line connection 113-2 may be configured as an address IN for a SmartWire input select line.

The serial network 105 may employ a SmartWire Darwin protocol. In one embodiment, the serial network 105 may employ a RS485 protocol. The serial network 105 may employ the version of a protocol that is specified by the filing date of the present application.

Figure 2A:
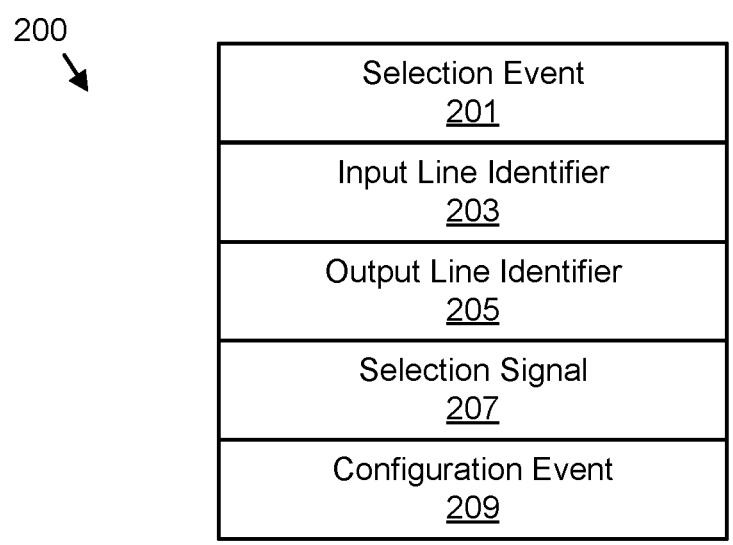
FIG. 2A is a schematic block diagram of bus data according to an embodiment.

FIG. 2A is a schematic block diagram of bus data 200. The bus data 200 may be used to configure the select line connections 113. The bus data 200 may be organized as a data structure in a memory. In the depicted embodiment, the bus data 200 includes a selection event 201, an input line identifier 203, an output line identifier 205, a selection signal 207, and a configuration event 209.

The selection event 201 may be receiving the selection signal 207 at one of the select line connections 113. In addition, the selection event 201 may be a manual switch 303 that connects the first select line connection 113 to the input line 121 and the second select line connection 113 to the output line 123. In a certain embodiment, the selection event 201 is receiving a point-to-point cable that connects the first select line connection 113 to the input line 121 and the second select line connection 113 to the output line 123.

The input line identifier 203 may identify a port on the communication hardware 125 as the input line 121. The output line identifier 205 may identify a port on the communication hardware 125 as the output line 123. The input line identifier 203 and the output line identifier 205 may be used to configure the first select line connection 113 for the input line 121 and the second select line connection 113 for the output line 123.

The selection signal 207 may originate at the originator device 101. A node device 103 may receive the selection signal 207 at the upstream select line 115a. In addition, a node device 103 may propagate the selection signal 207 at the downstream select line 115b.

The configuration event 209 may cause the embodiments to configure the bus direction module 109 and/or node device 103. In one embodiment, the configuration event 209 is determined by the originator device 101. In addition, the configuration event 209 may be determined by the network 107 and/or one or more node devices 103. The configuration event 209 may be selected from the group consisting of a power on, a reset, and a test.

Figure 2B:
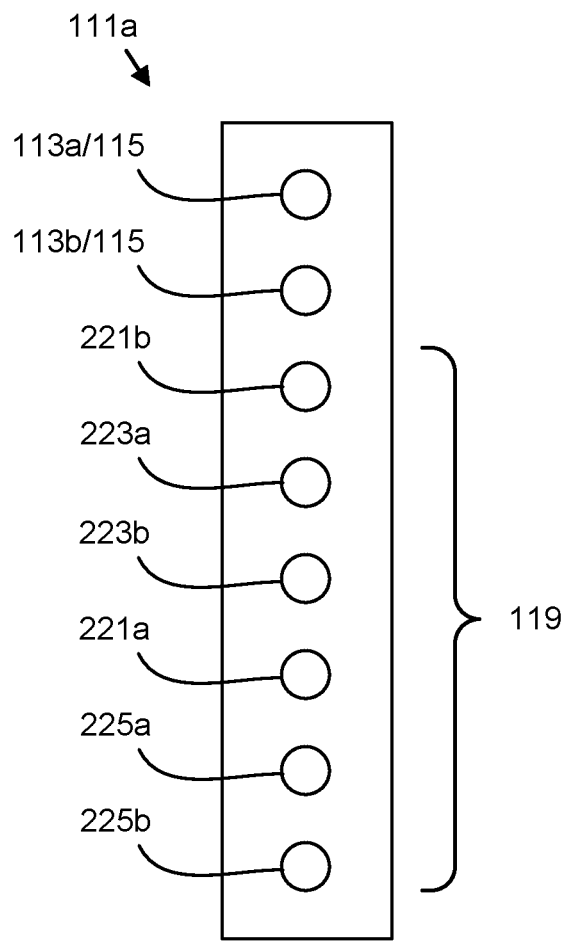
FIG. 2B is a schematic diagram of a node connection according to an embodiment.

FIG. 2B is a schematic diagram of a node connection 111a. In the depicted embodiment, the node connection 111a includes the select line 115 connected to the first select line connection 113a, the select line 115 connected to the second select line connection 113b, and a plurality of lines 119. In one embodiment, the lines 119 include a negative network power 221b, a positive Ethernet 223a, a negative Ethernet 223b, a positive network power 221a, a positive control power 225a, and a negative control power 225b. The Ethernet 223 provides communications for the device nodes 103. In one embodiment, a device node 103 accesses the Ethernet 223 if the select line 115 is asserted.

The positive network power 221a may provide regulated power for the node device 103. The negative network power 221b may provide negative and/or return regulated power for the node device 103. The positive control power 225a may provide unregulated power for the node device 103. The negative control power 225b may provide unregulated negative and/or return power for the node device 103.

Figure 2C:
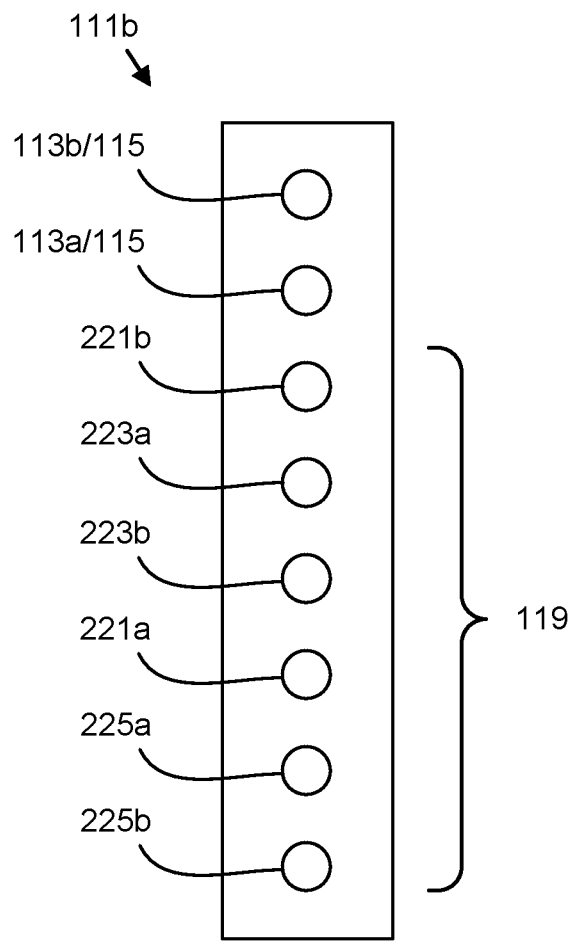
FIG. 2C is a schematic diagram of a node connection according to an alternate embodiment.

FIG. 2C is a schematic diagram of a node connection 111b. In the depicted embodiment, the select line 115 connected to the first selection line connection 113a and the select line 115 connected to the second selection line connection 113b are switched relative to the first node connection 111a of FIG. 2B.

Figure 2D:
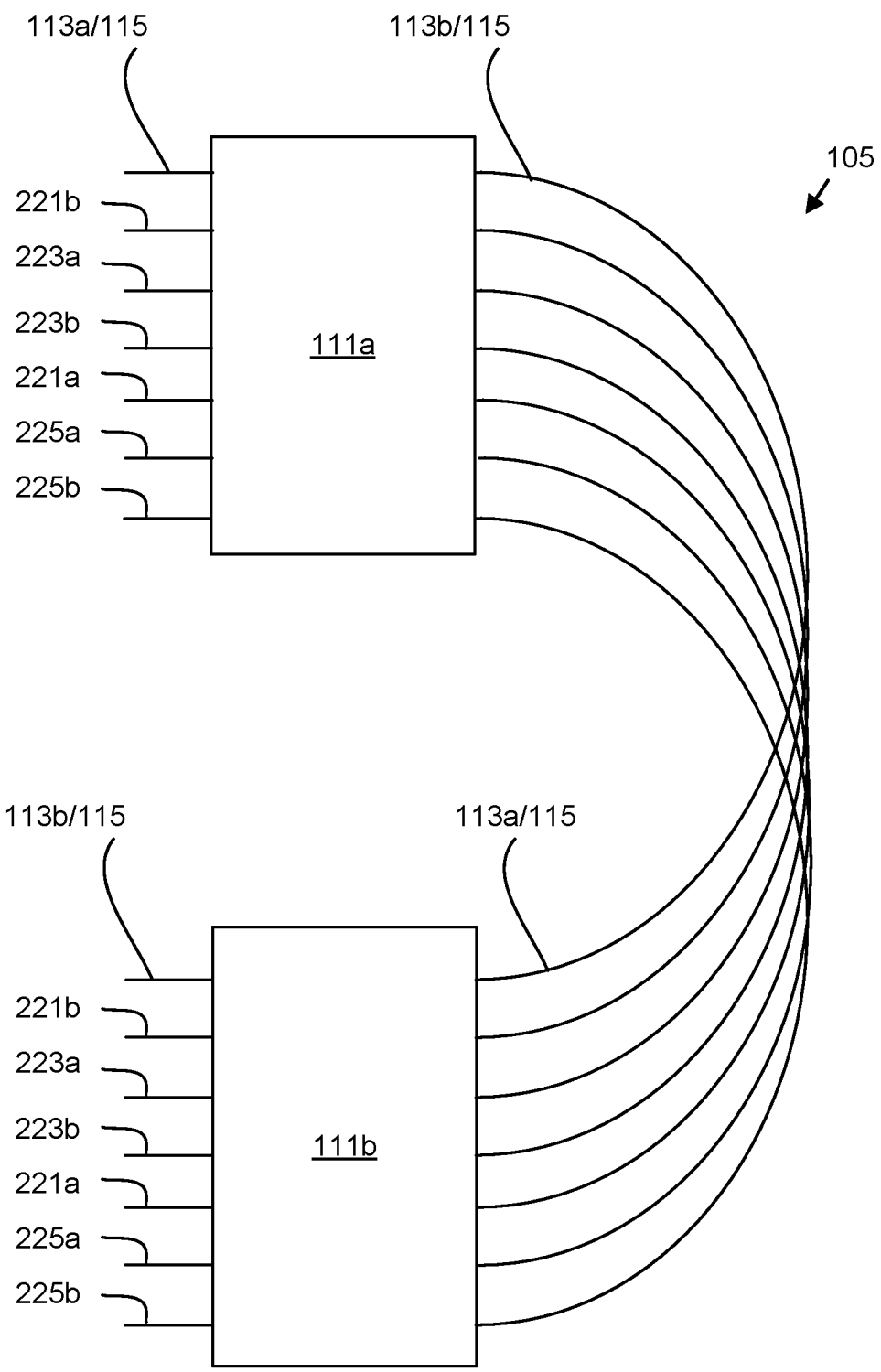
FIG. 2D is a schematic diagram of node connections according to an embodiment.

FIG. 2D is a schematic diagram of node connections 111a/b. In the depicted embodiment, node connections 111a/b on the serial network 105 have left and right select lines 115 connected to opposite configurations of first select line connections 113a and second select line connections 113b. As a result, serial network 105 may connect to a first row of node devices 103 in a left-to-right direction and a second row of node devices 103 in a right-to-left direction.

Figure 2E:
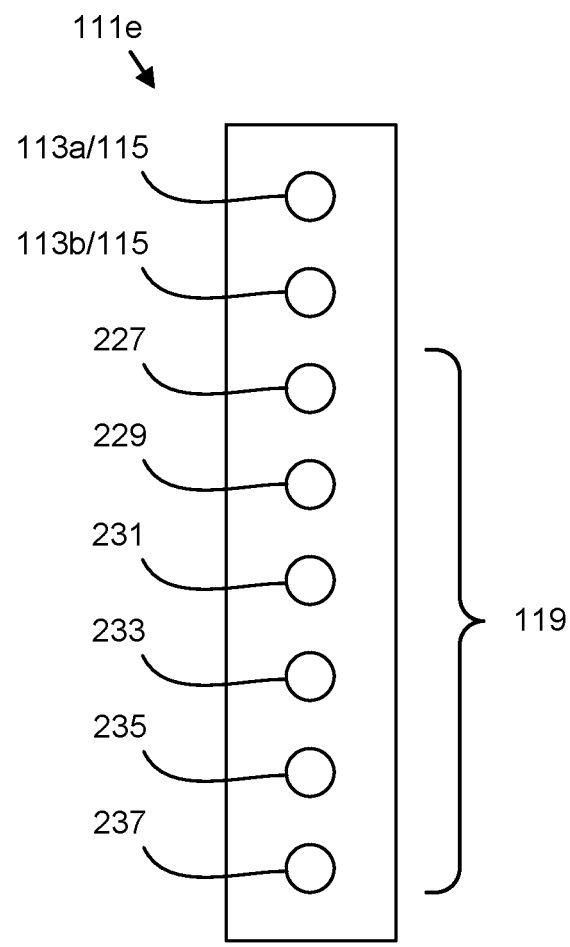
FIG. 2E is a schematic diagram of a node connection according to an alternate embodiment.

FIG. 2E is a schematic diagram of a node connection 111e for a LIN protocol. In the depicted embodiment, the node connection 111e includes the select line 115 connected to the first select line connection 113a, the select line 115 connected to the second select line connection 113b, and a plurality of lines 119. In one embodiment, the lines 119 include a supply voltage 227, an enable input 229, a ground 231, a LIN bus 233, a reset output 235, and a supply output 237.

Figure 2F:
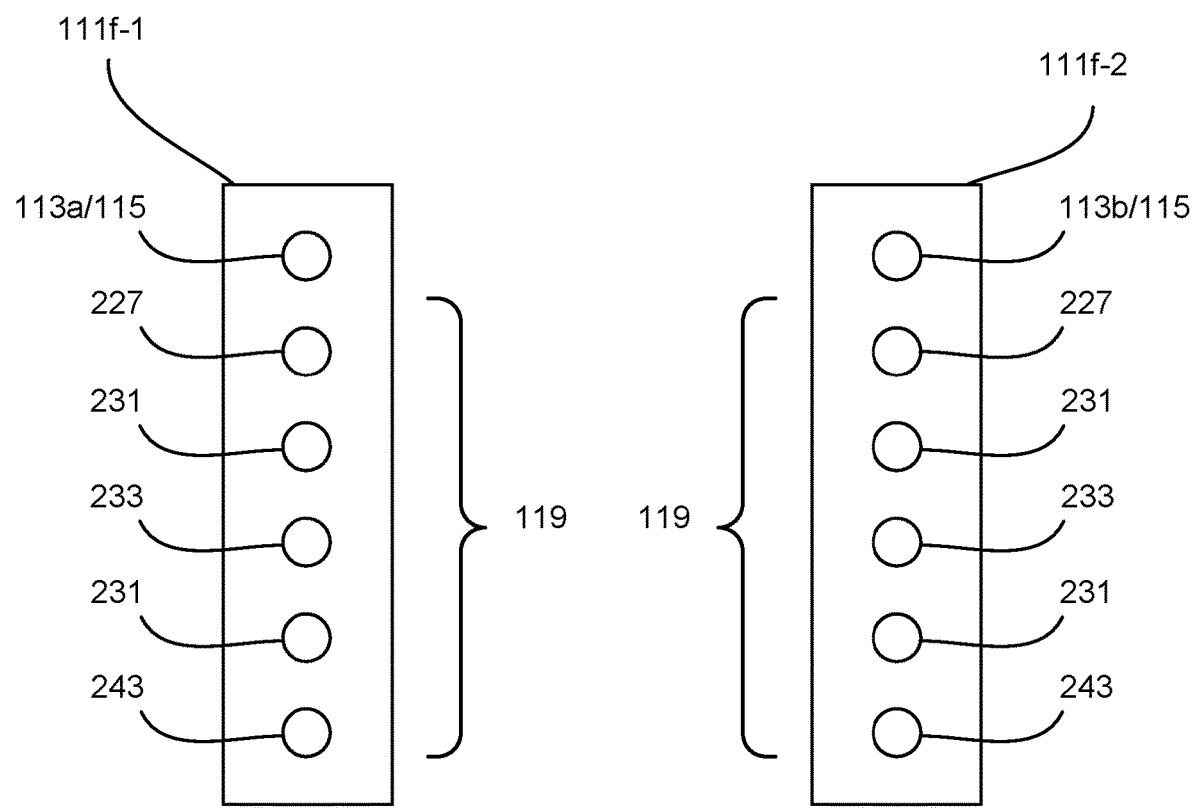
FIG. 2F is a schematic diagram of a node connection according to an alternate embodiment.

FIG. 2F is a schematic diagram of node connections 111f for an alternate LIN SmartWire protocol. The node connection 111f may be embodied in two connections. In the depicted embodiment, the node connection 111f includes the select line 115 connected to an address IN select line connection 113a of a first node connection 111f-1, the select line 115 connected to the address OUT select line connection 113b of the second node connection 111f-2, and a plurality of lines 119. In one embodiment, the lines 119 include a supply voltage 227, an address IN 239/address OUT 241, grounds 231, a LIN bus 233, and a LIN supply 243.

Figure 3A:
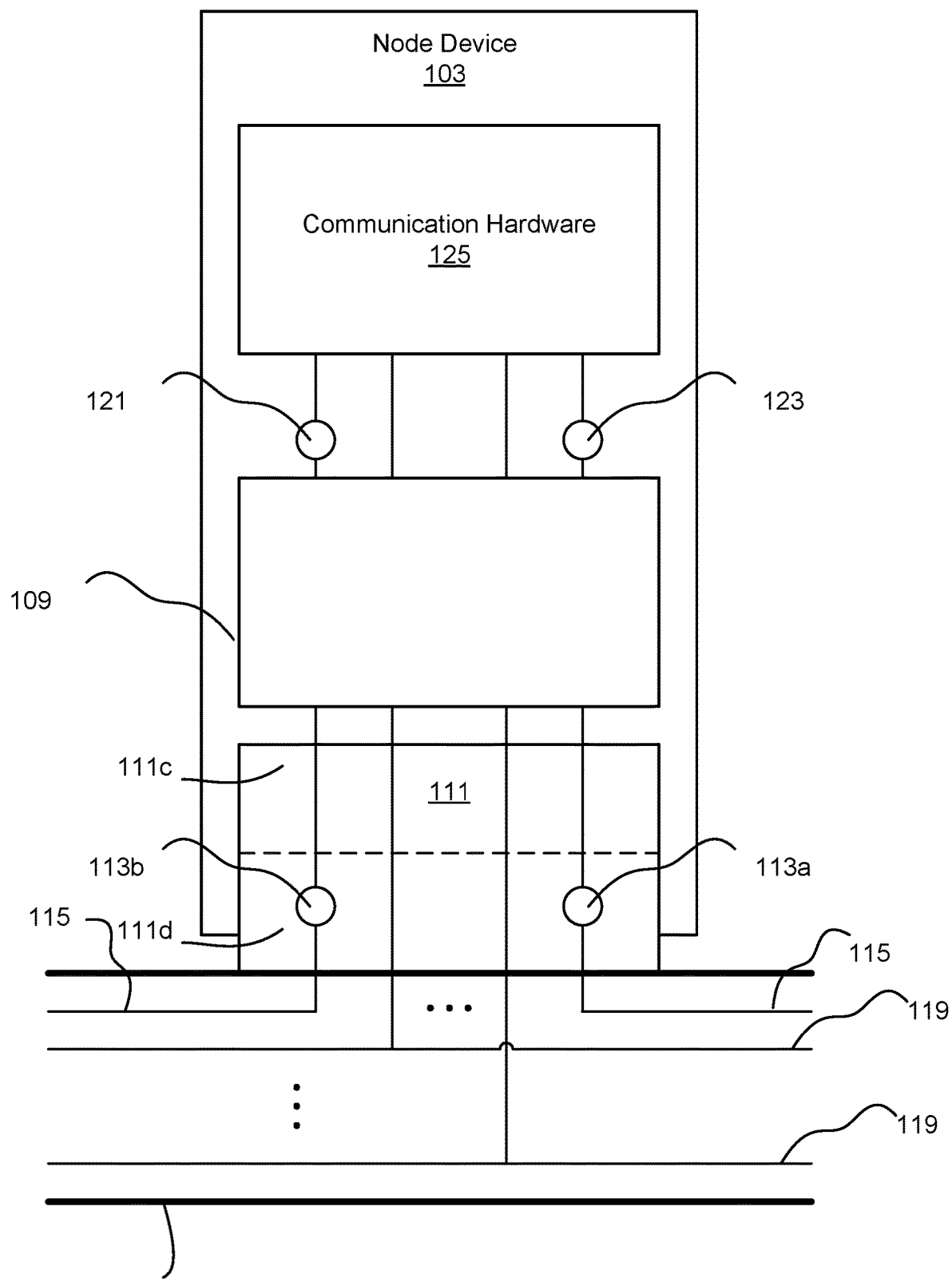
FIG. 3A is a schematic diagram of a node device according to an embodiment.
Figure 4A:
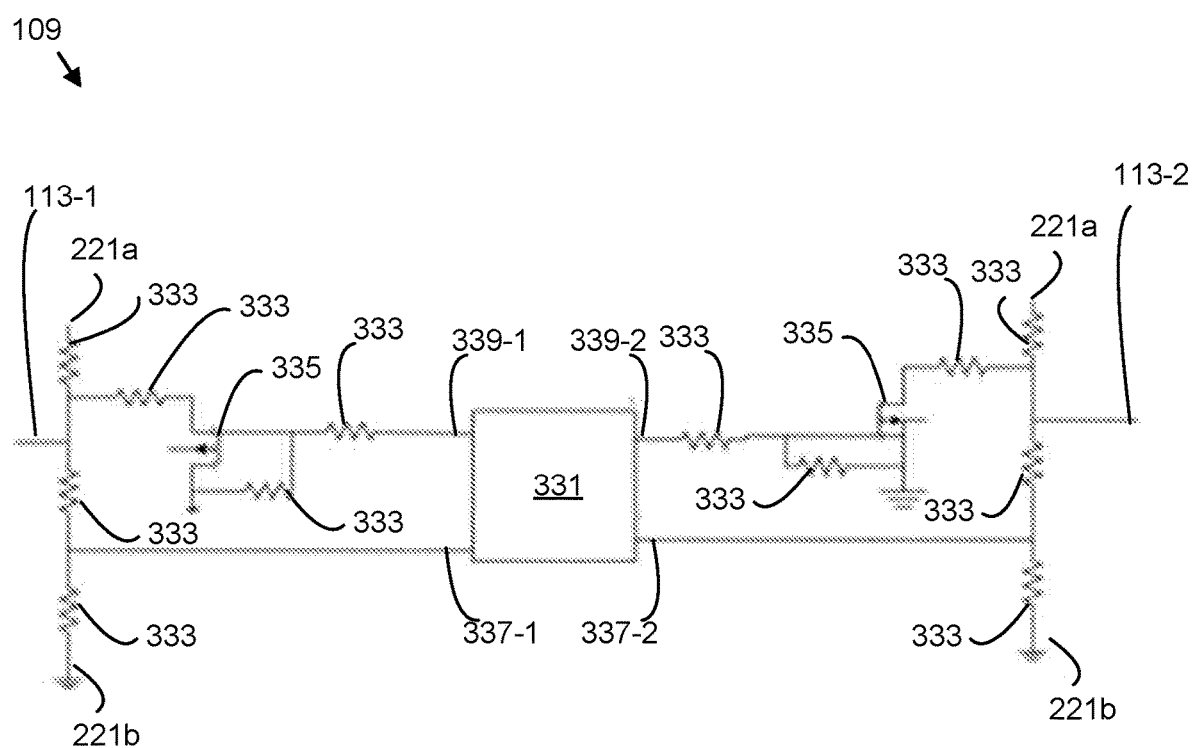
FIG. 4A is a schematic diagram of a bus direction module according to an embodiment.
Figure 4B:
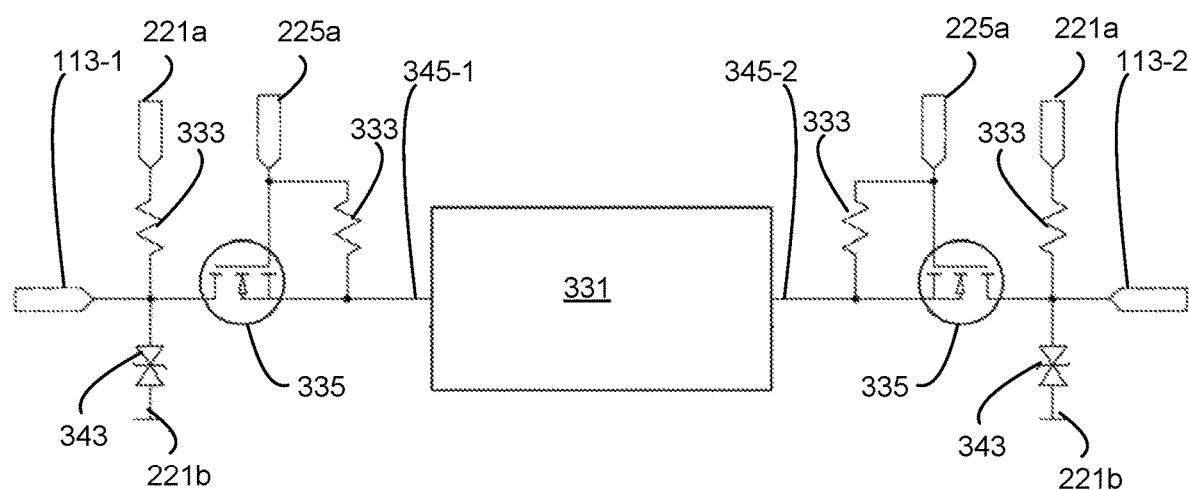
FIG. 4B is a schematic diagram of a bus direction module according to an alternate embodiment.
Figure 4C:
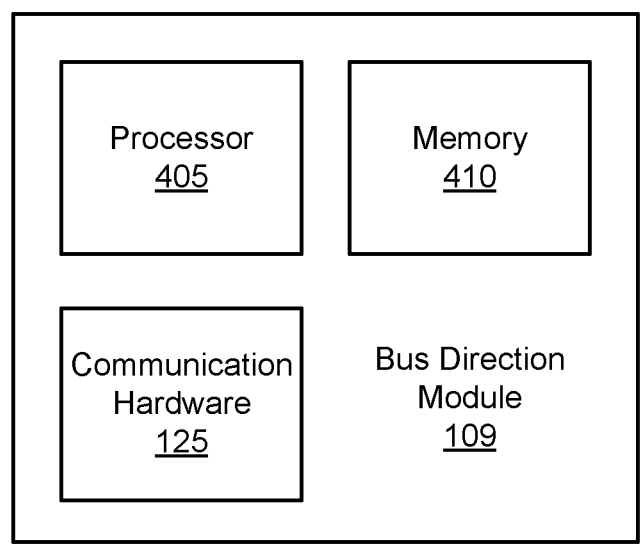
FIG. 4C is a schematic block diagram of a bus direction module according to an alternate embodiment.

FIG. 3A is a schematic diagram of a node device 103. In the depicted embodiment, the bus direction module 109 listens at both the select line connections 113/select lines 115 for a selection signal 207. The selection event 201 is receiving a selection signal 207 at one of the select line connections 113/select lines 115. In response to receiving the selection signal 207, the bus direction module 109 configures a first select line connection 113a for the input line 121 and a second select line connection 113b for the output line 123. As a result, the node device 103 may support a right-to-left direction of serial network 105 connections as shown while another node device 103 supports a left-to-right direction. Embodiments of the bus direction module 109 for the node device 103 of FIG. 3A are shown in FIGS. 4A-C.

Figure 3B:
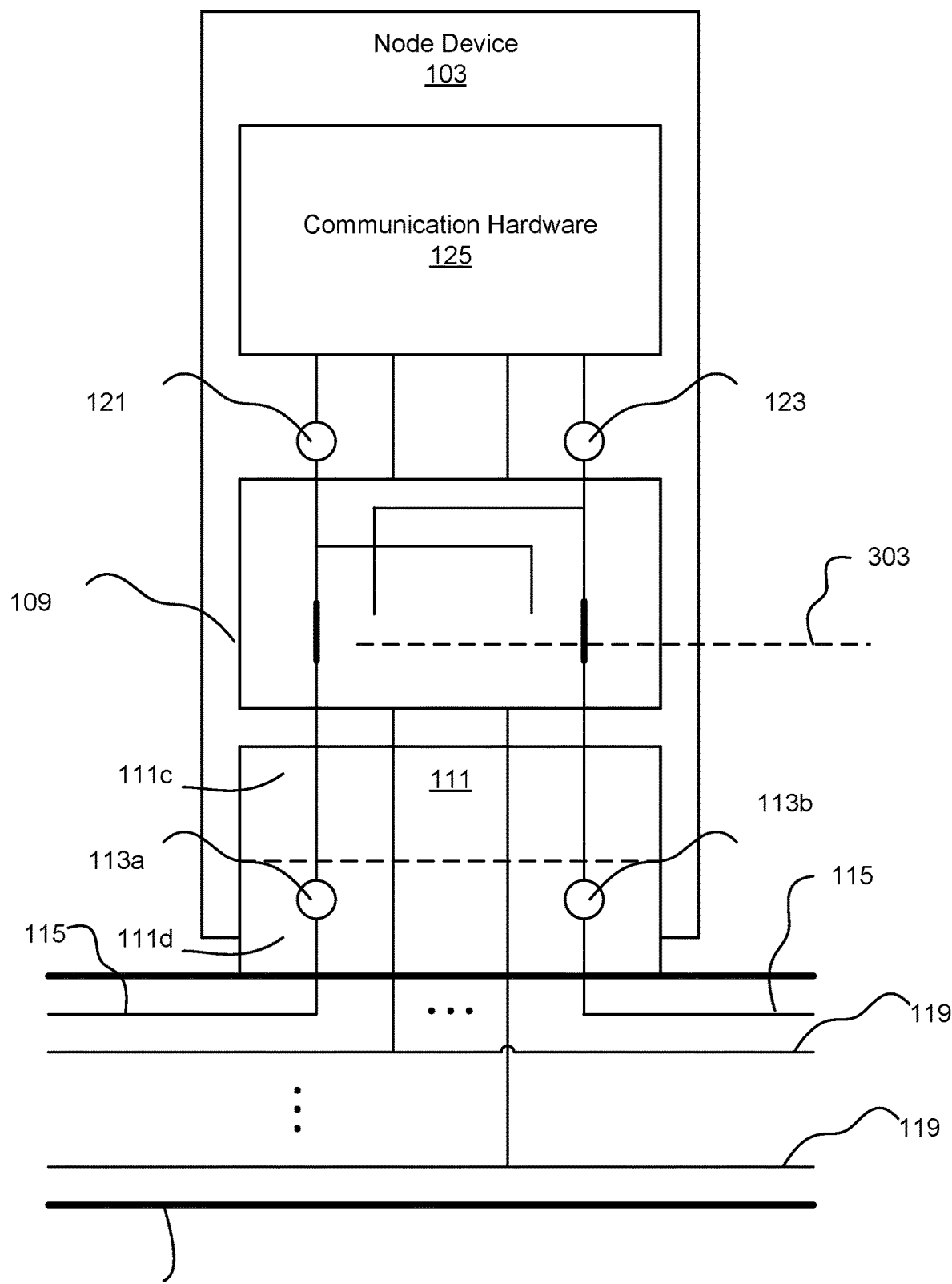
FIG. 3B is a schematic diagram of a node device and manual switch according to an embodiment.

FIG. 3B is a schematic diagram of a node device 103. In the depicted embodiment, the bus direction module 109 comprises a manual switch 303. FIGS. 3F-J illustrate embodiments of the manual switch 303. In one embodiment, the selection event 201 is the manual switch 303 that connects the first select line connection 113a to the input line 121 and the second select line connection 113b to the output line 123 as shown. As a result, the depicted node device 103 may support a left-to-right direction of serial network 105 connections.

In one embodiment, the manual switch 303 is disposed in the node device 103. Alternatively, the manual switch 303 may be disposed in the node connection 111. The manual switch 303 may be disposed in the node connection 111d in physical communication with the serial network 105. Alternatively, the manual switch 303 may be disposed in the node connection 111c in physical communication with node device 103.

Figure 3C:
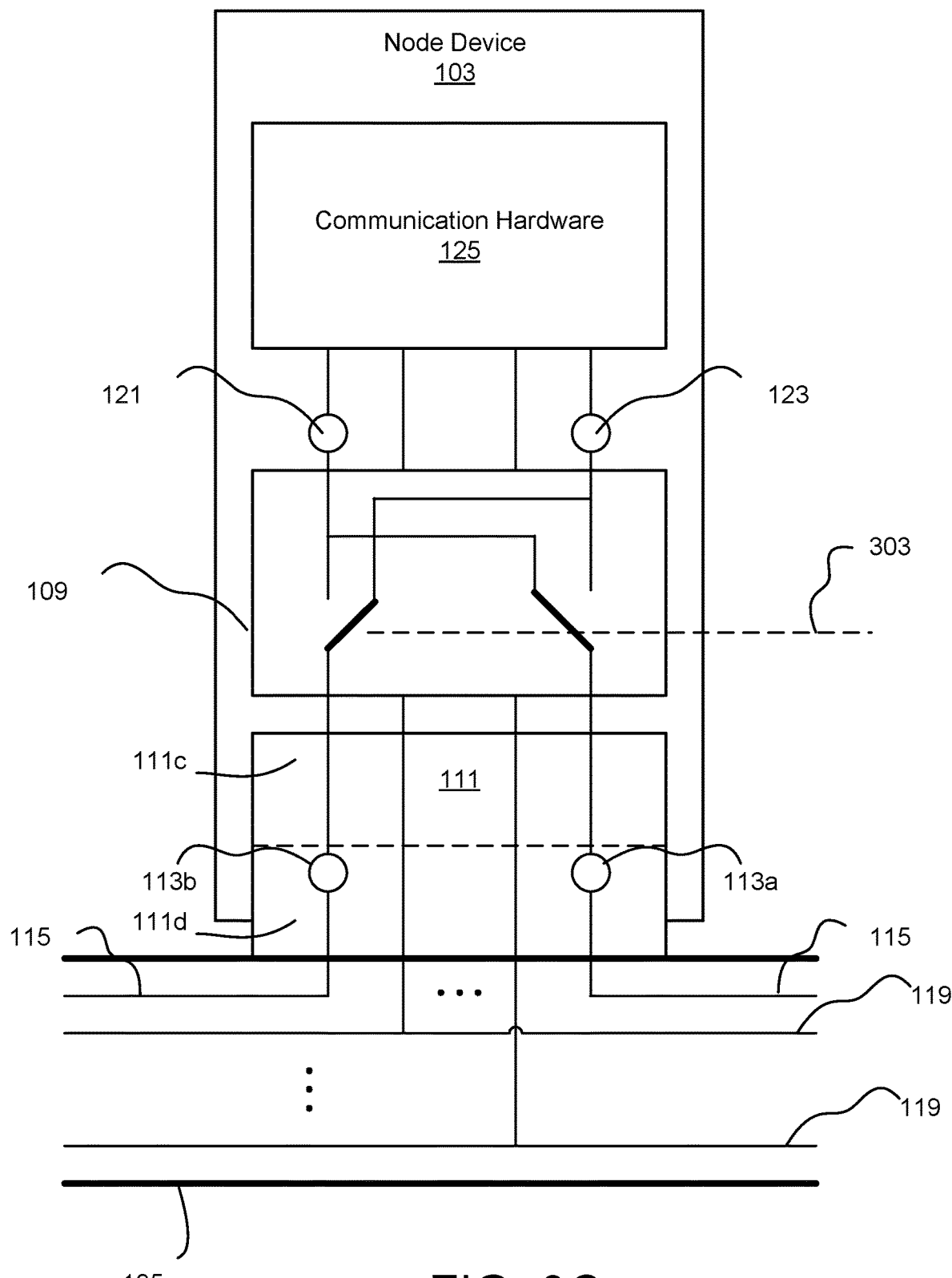
FIG. 3C is a schematic diagram of a node device and manual switch according to an alternate embodiment.

FIG. 3C is a schematic diagram of the node device 103 of FIG. 3B. In the depicted embodiment, the positions of the first select line connection 113a and the second select line connection 113b are reversed by the manual switch 303. As a result, the depicted node device 103 may support a right-to-left direction of serial network 105 connections.

Figure 3D:
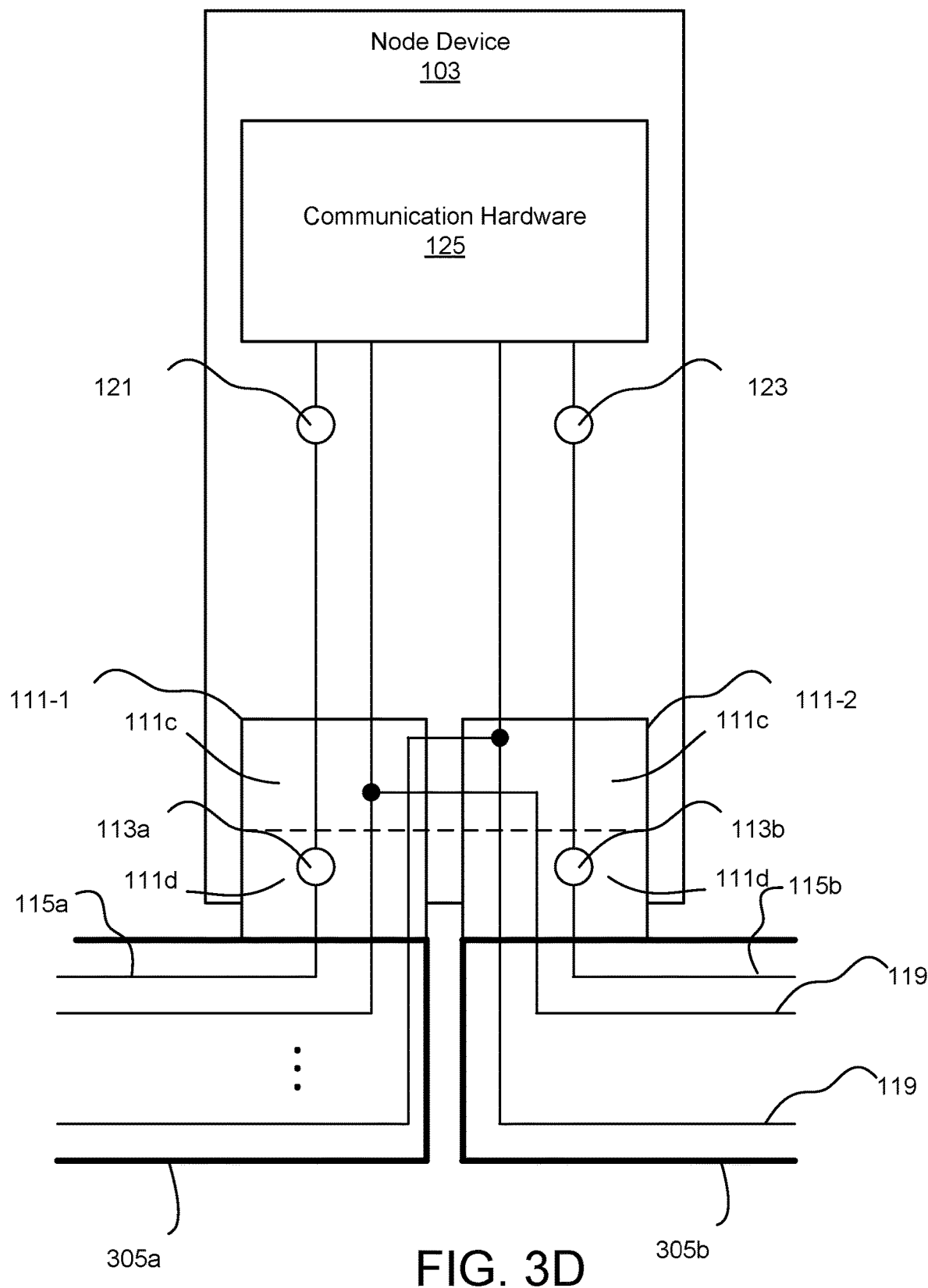
FIG. 3D is a schematic diagram of a node device and point-to-point cable according to an embodiment.

FIG. 3D is a schematic diagram of a node device 103 and point-to-point cables 305. In the depicted embodiment, the serial network 105 of FIG. 1B comprises the point-to-point cables 305. Each point-to-point cable 305 connects at least two node devices 103. A first point-to-point cable 305a with a node connection 111-1 connects the first select line connection 113a to the input line 121 and a second point-to-point cable 305b with a node connection 111-2 connects the second select line connection 113b to the output line 123. As a result, the node device 103 may support a left-to-right direction of serial network 105 connections. The bus direction module 109 may be embodied in the point-to-point cables 305a-b.

Figure 3E:
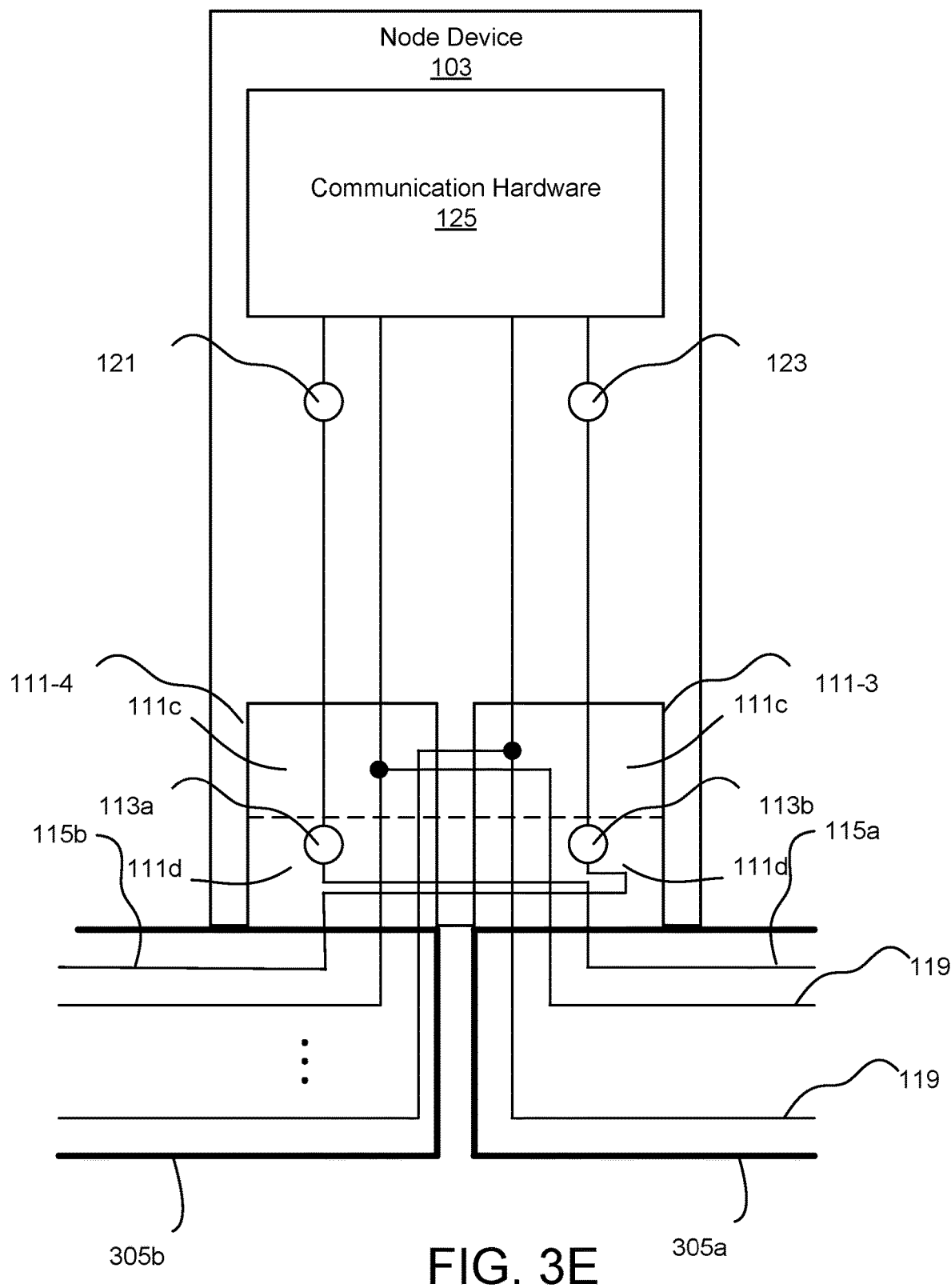
FIG. 3E is a schematic diagram of a node device and point-to-point cable according to an alternate embodiment.

FIG. 3E is a schematic diagram of a node device 103 and point-to-point cables 305. In the depicted embodiment, the serial network 105 of FIG. 1B comprises the two point-to-point cables 305a-b. Each point-to-point cable 305 connects at least two node devices 103. A first point-to-point cable 305a with a node connection 111-3 connects the first select line connection 113a to the input line 121 and a second point-to-point cable 305b with a node connection 111-4 connects the second select line connection 113b to the output line 123. As a result, the depicted node device 103 may support a right-to-left direction of serial network 105 connections. The bus direction module 109 may be embodied in the point-to-point cables 305a-b.

Figure 3F:
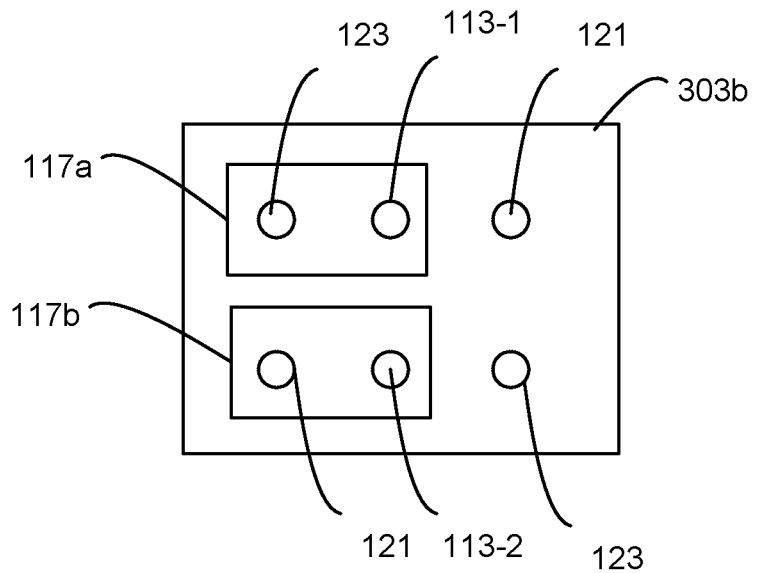
FIG. 3F is a schematic diagram of a manual switch according to an embodiment.

FIG. 3F is a schematic diagram of a dual inline package (DIP) manual switch 303b or DIP switch 303b. In the depicted embodiment, a first switch connection 117a connects one select line connection 113-1 to the output line 123 and a second switch connection 117b connects the other select line connection 113-2 to the input line 121.

Figure 3G:
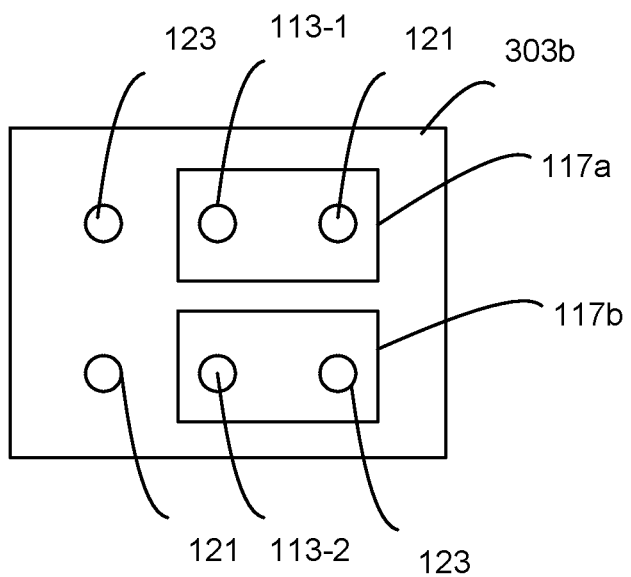
FIG. 3G is a schematic diagram of a manual switch according to an alternate embodiment.

FIG. 3G is a schematic diagram of the DIP manual switch 303b. In the depicted embodiment, the first switch connection 117a and second switch connection 117b of FIG. 3F are reversed. As a result, a first switch connection 117a connections the other select line connection 113-2 to the output line 123 and a second switch connection 117b connects the one select line connection 113-1 to the input line 121.

Figure 3H:
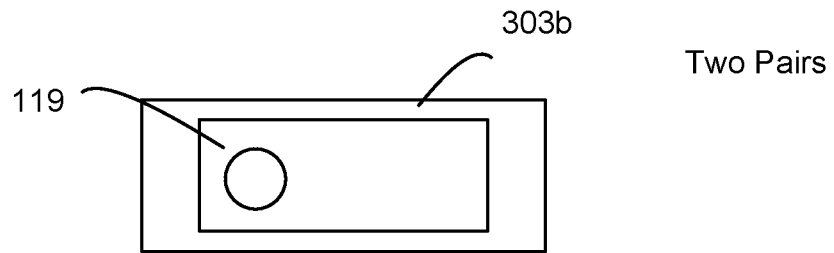
FIG. 3H is a schematic diagram of a manual switch according to an alternate embodiment.

FIG. 3H is a schematic diagram of a manual switch 303b. In the depicted embodiment, a single switch 119 is shown. The single switch 119 may toggle both the first switch connection 117a and the second switch connection 117b of FIGS. 3F-G.

Figure 3I:
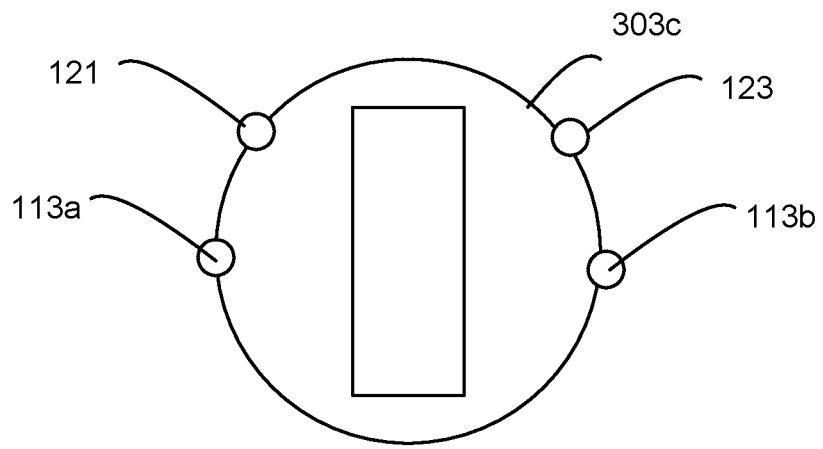
FIG. 3I is a schematic diagram of a manual switch according to an alternate embodiment.

FIG. 3I is a schematic diagram of a rotary manual switch 303c or rotary switch 303c. The rotary manual switch 303c may toggle both the first switch connection 117a and the second switch connection 117b of FIGS. 3F-G.

Figure 3J:
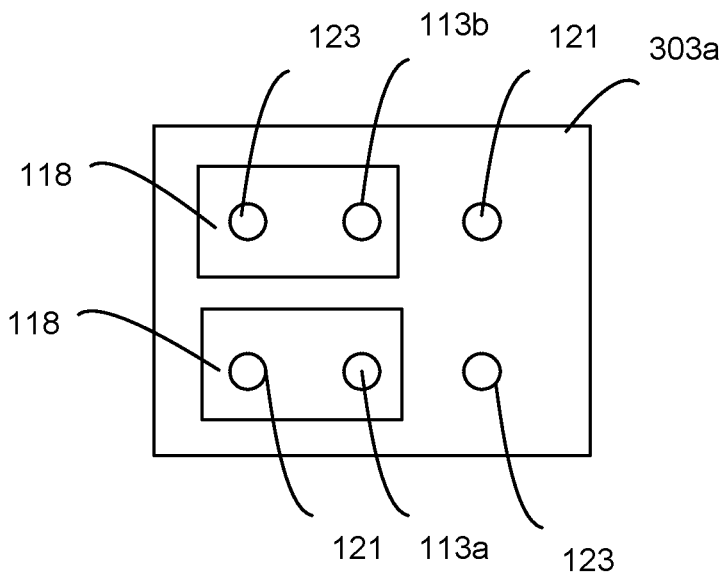
FIG. 3J is a schematic diagram of a manual switch according to an alternate embodiment.

FIG. 3J is a schematic diagram of a jumper manual switch 303a or jumper switch 303a. In the depicted embodiment, jumpers 118 connect one select line connection 113-1 to the output line 123 and the other select line connection 113-2 to the input line 121.

Figure 3K:
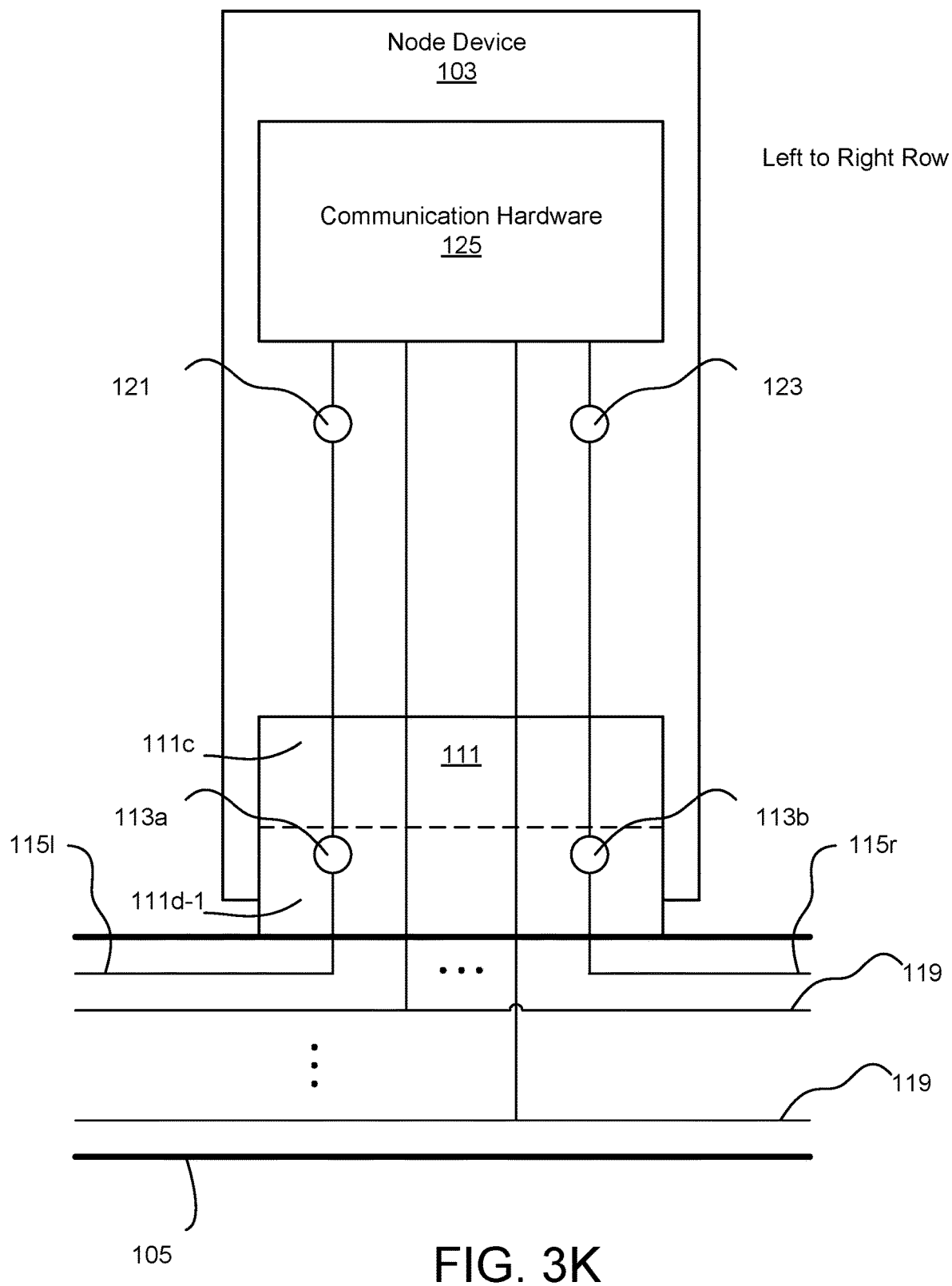
FIG. 3K is a schematic diagram of a node device according to an embodiment.

FIG. 3K is a schematic diagram of a node device 103. In the depicted embodiment, a first directional node connection 111d-1 in physical communication with the serial network 105 connects a left select line 115l with the input line 121 and connects a right select line 115r with the output line 123. The bus direction module 109 may be embodied in the first directional node connection 111d-1. The first directional node connection 111d-1 may be a left-to-right node connection manual switch 303.

Figure 3L:
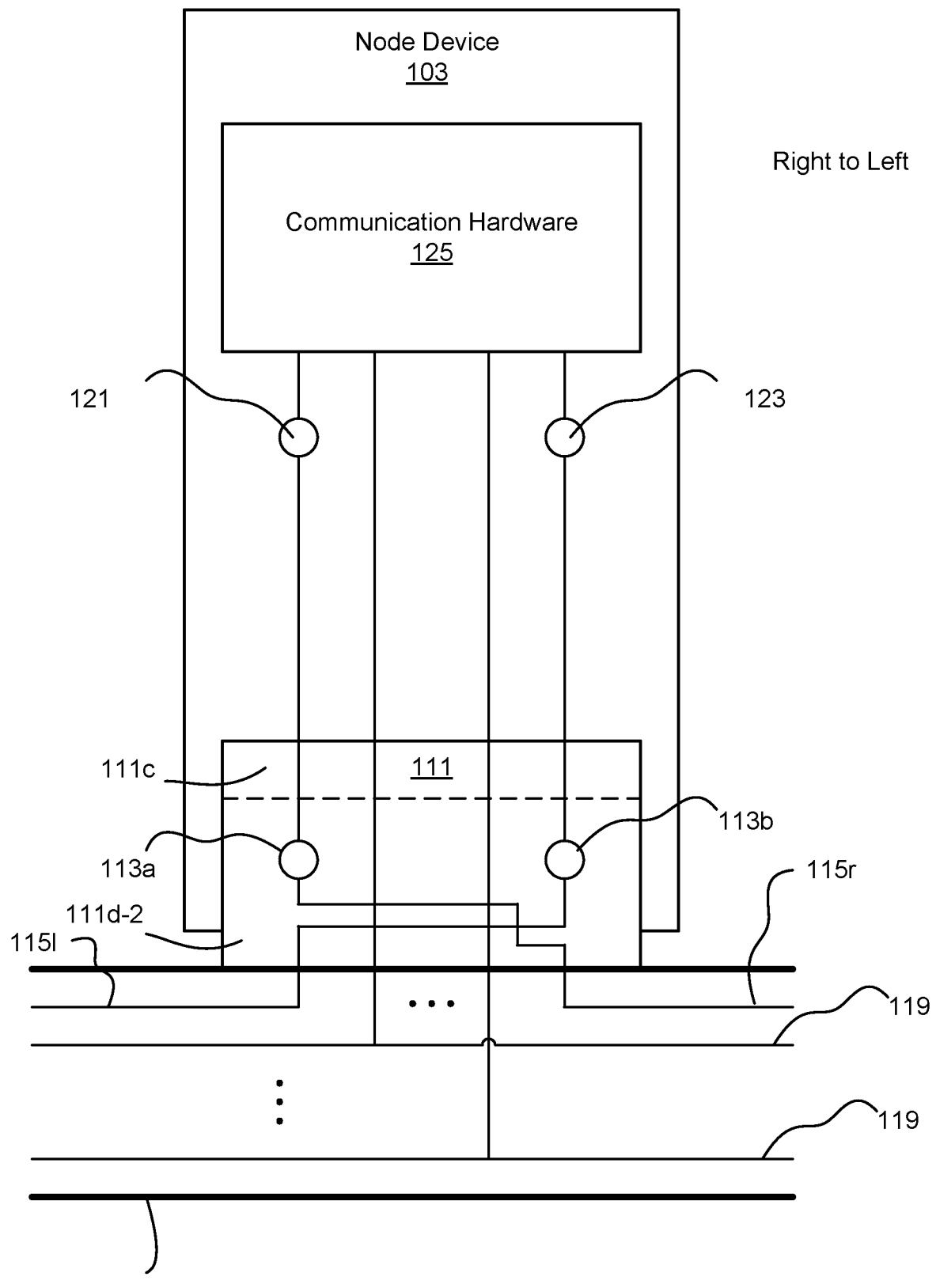
FIG. 3L is a schematic diagram of a node device according to an embodiment.

FIG. 3L is a schematic diagram of a node device 103. In the depicted embodiment, a second directional node connection 111d-2 in physical communication with the serial network 105 connects a left select line 115l with the output line 123 and connects a right select line 115r with the input line 121. The bus direction module 109 may be embodied in the second node connection 111d-2. The second directional node connection 111d-2 may be a right-to-left node connection manual switch 303.

FIG. 4A is a schematic diagram of a bus direction module 109. In the depicted embodiment, the bus direction module 109 includes a microcontroller 331, a plurality of resistors 333 and transistors 335 powered by the network power 221. The bus direction module 109 is connected to the two select line connections 113-1/2. The microcontroller 331 includes two signal inputs 337-1/2 and two signal outputs 339-1/2. The microcontroller 331 detects the selection signal 207 at one of the two signal inputs 337-1/2 and in response outputs the selection signal 207 at the other signal output 339-1/2 to propagate the selection signal 207. For example, if the selection signal 207 is detected at one signal input 337-1, the microcontroller 331 outputs the selection signal 207 at the other signal output 339-2. Thus, the selection signal 207 is propagated.

FIG. 4B is a schematic diagram of a bus direction module 109. The bus direction module 109 includes a microcontroller 331, a plurality of resistors 333, diodes 343, and transistors 335 powered by the network power 221 and the control power 225. The microcontroller 331 includes two bi-directional nodes 345-1/2. The microcontroller 331 may detect the selection signal 207 on one node 345-2 and output the selection signal 207 on the other node 345-1 if the selection signal 207 is propagated.

FIG. 4C is a schematic diagram of a bus direction module 109. In the depicted embodiment, the bus direction module 109 includes a processor 405, a memory 410, and communication hardware 125. The memory 410 may store code and data. The processor 405 may execute the code and process the data. The processor 405 may detect the selection signal 207 via the communication hardware 125 at one select line connection 113-1. The processor 405 may further output the selection signal 207 via the communication hardware 125 at the other select line connection 113-2 if the selection signal 207 is propagated.

Figure 5A:
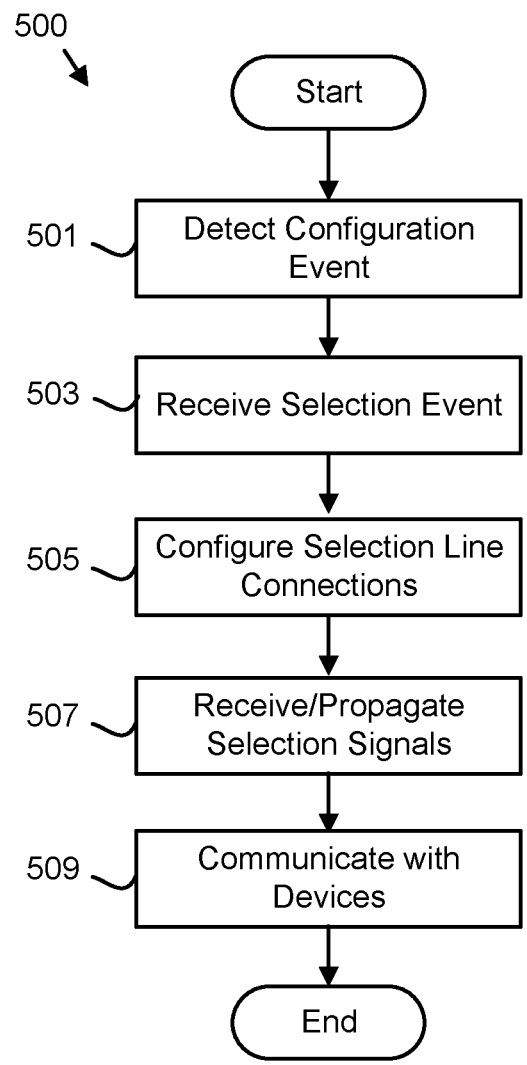
FIG. 5A is a schematic flow chart diagram of a communication method according to an embodiment.

FIG. 5A is a schematic flow chart diagram of a communication method 500. The method 500 may configure the selection line connections 113 to support communication between the node devices 103 and the originator device 101. The method may be performed by the bus direction module 109, node device 103, and/or originator device 101.

The method 500 starts, and in one embodiment, the bus direction module 109, node device 103, and/or originator device 101 detects 501 a configuration event 209. The configuration event 209 may be selected from the group consisting of a power on of the system 100, bus direction module 109, node device 103, and/or originator device 101, a reset of the system 100, bus direction module 109, node device 103, and/or originator device 101, and a test of the system 100, bus direction module 109, node device 103, and/or originator device 101.

In one embodiment, in response to the configuration event 209, the originator device 101 may communicate the selection signal 207 via the select line 115. For example, the selection signal 207 may be directed to each node device 103 in turn to configure the node device 103.

The bus direction module 109 and/or node device 103 receives 503 the selection event 201. In one embodiment, the selection event 201 is receiving the selection signal 207 at one of the select line connections 113 and/or select lines 115. Receiving the selection signal 207 is described in more detail in FIG. 5B.

In addition, the selection event 201 may be the manual switch 303 and/or a setting of the manual switch 303 as shown in FIGS. 3B-C. In one embodiment, the selection event 201 is the installation of a first directional node connection 111d-1 or a second directional node connection 111d-2 as shown in FIGS. 3K-L. In a certain embodiment, the selection event 201 is receiving point-to-point cables 305 that connect the first select line connection 113a to the input line 121 and the second select line connection 113b to the output line 123 as shown in FIGS. 3D-E.

The bus direction module 109 configures 505 the first select line connection 113a for the input line 121 and the second select line connection 113b for the output line 123 in response to the selection event 201 as shown in FIG. 3A. In one embodiment, the bus direction module 109 electronically designates the first select line connection 113a and second select line connection 113b as shown in the embodiments of FIGS. 4A-B. For example, the input line identifier 203 may be set to a port for the first select line connection 113a and the output line identifier 205 may be set to a port for the second select line connection 113b.

In addition, the setting of the manual switch 303 may configure 505 the first select line connection 113a for the input line 121 and the second select line connection 113b for the output line 123 as shown in FIGS. 3B-C. The manual switch 303 may be selected from the group consisting of the jumper switch 303a, a DIP switch 303b, and a rotary switch 303c. In a certain embodiment, the manual switch 303 is a connector selected from the group consisting of the left-to-right node connection 111d-1 and the right-to-left node connection 111d-2.

The receiving of point-to-point cables 305 may be the selection event 201. The point-to-point cables 305 may connect the first select line connection 113a to the input line 121 and the second select line connection 113b to the output line 123 as shown in FIGS. 3D-E.

In one embodiment, the selection of the node connection 111 configures 505 the select line connections 113. The node connection 111 may be one of a first directional connection node 111d-1 that connects one select line connection 113-1 to the input line 121 and the other select line connection 113-2 to the output line 123 or a second directional connection node 111d-2 that connects the other select line connection 113-2 to the input line 121 and the one select line connection 113-1 to the output line 123.

The bus direction module 109 and/or node device 103 may receive and/or propagate 507 the selection signals 207 using the configured select line connections 113. As a result, the node device 103 may communicate 509 with other node devices 103 and/or the originator device 101 and the method 500 ends.

Figure 5B:
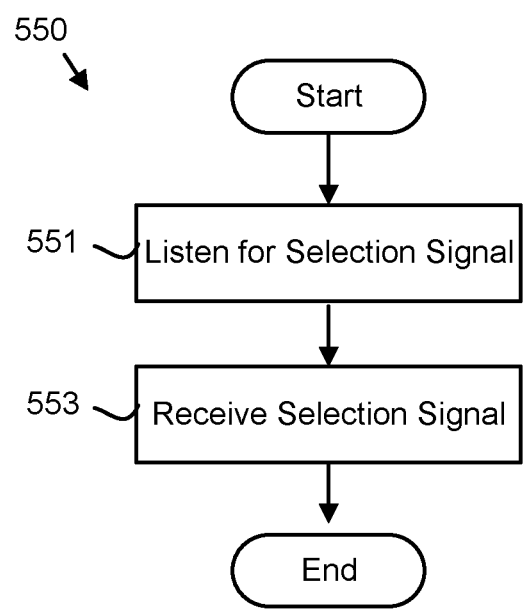
FIG. 5B is a schematic flow chart diagram of a selection method according to an embodiment.

FIG. 5B is a schematic flow chart diagram of a selection method 550. The selection method 550 may electronically configure the first select line connection 113a for the input line 121 and the second select line connection 113b for the output line 123 in response to the selection event 201. The method 550 may be performed by the bus direction module 109.

The bus direction module 109 may listen 551 at the select line connections 113 and/or select lines 115 for the selection signal 207. The bus direction module 109 further receives 553 the selection signal 207 at one of the select line connections 113 and/or select lines 115 as the selection event 201 and the method 550 ends.

Problem/Solution

A serial network 105 may employ a select line 115 to locate node devices 103 on the serial network 105. The select line 115 may be broken at each node device 103, with an upstream select line 115a and the downstream select line 115b. In the past, only a single orientation of the serial network 105 could be employed at each node device 103 so that the upstream select line 115a was received at the input line 121 and the output line 123 was connected to the downstream select line 115b. As a result, the serial network 105 had to be doubled back to connect multiple rows of node devices 103.

The embodiments configure the first select line connection 113a for the input line 121 and the second select line connection 113b for the output line 123 in response to a selection event 201. The configuration may be automatic. As a result, the upstream select line 115a is appropriately connected to the input line 121 and the downstream select line 115b is appropriately connected to the output line 123 regardless of the direction the serial bus 105 connects to the node device 103. Thus, the routing of the serial network 105 is more efficient, reducing cost and the space required by the serial network 105.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
a node connection comprising two select line connections for a select line of a serial network, wherein the serial network is a Local Interconnect Network (LIN) and the select line is discontinuous at the node connection;
a bus direction module that listens at the two select line connections for a selection signal, wherein the selection signal is a LIN selection signal, and in response to detecting a selection event of receiving the selection signal at a first select line connection, the bus direction module configures the first select line connection for a LIN input select line and a second select line connection for a LIN output select line, and outputs the selection signal on the second select line connection to a second node connection;
wherein at least a portion of the bus direction module comprises one or more of hardware and executable code, the executable code stored on a memory.

2. The apparatus of claim 1, wherein the selection signal originates at an originator device in response to a configuration event selected from the group consisting of a power on, a reset, and a test.

3. The apparatus of claim 1, wherein the selection event further comprises a manual switch that connects the first select line connection to the LIN input select line and the second select line connection to the LIN output select line.

4. The apparatus of claim 3, wherein the manual switch is a node connection selected from the group consisting of a left-to-right node connection and a right-to-left node connection.

5. The apparatus of claim 3, wherein the manual switch is selected from the group consisting of a jumper, a dual inline package (DIP) switch, and a rotary switch.

6. The apparatus of claim 3, wherein the manual switch is disposed in a node device.

7. The apparatus of claim 1, wherein the selection event further comprises receiving point-to-point cables that connect the first select line connection to the input line and the second select line connection to the output line.

8. The apparatus of claim 1, wherein the node connection is one of a first directional connection node that connects one select line connection to the LIN input select line and the other select line connection to the LIN output select line or a second directional connection node that connects the other select line connection to the LIN input select line and the one select line connection to the LIN output select line.

9. A method comprising:
detecting a selection event at a node connection comprising two select line connections for a select line of a serial network, wherein the serial network is a Local Interconnect Network (LIN) and the select line is discontinuous at the node connection;
listening at the two select line connections for a selection signal, wherein the selection signal is a LIN selection signal;
in response to detecting a selection event of receiving the selection signal at a first select line connection, configuring the first select line connection for a LIN input select line and a second select line connection for a LIN output select line; and outputting the selection signal on the second select line connection to a second node connection.

10. The method of claim 9, wherein the selection signal originates at an originator device in response to a configuration event selected from the group consisting of a power on, a reset, and a test.

11. The method of claim 9, wherein the selection event further comprises a manual switch that connects the first select line connection to the LIN input select line and the second select line connection to the LIN output select line.

12. The method of claim 11, wherein the manual switch is a node connection selected from the group consisting of a left-to-right node connection and a right-to-left node connection.

13. The method of claim 11, wherein the manual switch is selected from the group consisting of a jumper, a dual inline package (DIP) switch, and a rotary switch.

14. The method of claim 11, wherein the manual switch is disposed in a node device.

15. The method of claim 9, wherein the selection event further comprises receiving point-to-point cables that connect the first select line connection to the input line and the second select line connection to the output line.

16. The method of claim 9, wherein the node connection is one of a first directional connection node that connects one select line connection to the LIN input select line and the other select line connection to the LIN output select line or a second directional connection node that connects the other select line connection to the LIN input select line and the one select line connection to the LIN output select line.

17. A system comprising:

an originator device that originates a selection signal;

a node device comprising two select line connections for a select line of a serial network, wherein the serial network is a Local Interconnect Network (LIN) and the select line is discontinuous at the node connection, and the node device listens at the two select line connections for a selection signal, wherein the selection signal is a LIN selection signal, and in response to detecting a selection event of receiving the selection signal at a first select line connection, configures the first select line connection for a LIN input select line and a second select line connection for a LIN output line, and outputs the selection signal on the second select line connection to a second node connection;

wherein at least a portion of the originator device and the node device comprises one or more of hardware and executable code, the executable code stored on a memory.

18. The system of claim 17, wherein the selection signal originates at an originator device in response to a configuration event selected from the group consisting of a power on, a reset, and a test.

19. The system of claim 17, wherein the selection event further comprises a manual switch that connects the first select line connection to the LIN input select line and the second select line connection to the LIN output select line.

20. The system of claim 19, wherein the manual switch is a node connection selected from the group consisting of a left-to-right node connection and a right-to-left node connection.

* * * * *